United States Patent [19]

Matsuo et al.

[11] 3,769,587

[45] Oct. 30, 1973

[54] SYNCHRONIZING SYSTEM FOR PHASE-MODULATION TELECOMMUNICATION SYSTEM

[75] Inventors: Yoshio Matsuo; Shigetoki Sugimoto, both of Tokyo, Japan

[73] Assignee: Nippon Electric Company, Limited, Tokyo, Japan

[22] Filed: Oct. 6, 1972

[21] Appl. No.: 295,643

[30] Foreign Application Priority Data

Oct. 19, 1971 Japan ............................... 46/83063

[52] U.S. Cl. .......... 325/320, 178/69.5 R, 179/15 BS

[51] Int. Cl. .............................................. H04b 1/16

[58] Field of Search ............... 178/69.5 R, 69.5 DC, 178/69.5 G, 67, 88; 179/15 BS; 325/13, 58, 320, 30, 476

[56] References Cited

UNITED STATES PATENTS 3,504,125 3/1970 Inose et al. ...................... 179/15 BS

*Primary Examiner*—Albert J. Mayer
*Attorney*—Richard C. Sughrue et al.

[57] ABSTRACT

The burst acquisition time in a phase-modulated TDMA satellite communication system is reduced by means of a novel demodulator at a receiving station. The received carrier frequency is filtered out of the two-phase phase-modulated preamble word portion of the received signal and a reference carrier signal is extracted therefrom. The N-phase phase modulated information word portion is reverse phase-modulated and phase-shifted so that its carrier frequency has the same relative phase as that of the preamble word portion, and a reference carrier signal is extracted therefrom. Consequently, the reference carrier is continuously recovered across the boundary of the preamble and information word portions and is available to demodulate the burst signal.

6 Claims, 11 Drawing Figures

SYNCHRONIZING SYSTEM FOR PHASE-MODULATION TELECOMMUNICATION SYSTEM

This invention relates to a synchronizing system for phase-modulation telecommunication system and, more particularly, to a demodulating device of this kind suited for the phase shift keying (PSK) modem for a satellite communication system.

Recently, there has been an increasing demand for satellite communications. Since the principal part of the cost of constructing a satellite communication system is occupied by the manufacturing cost of the artificial satellite itself, efficient use should be made of the on-board relay equipment. The time division multiple access (TDMA) system has been proosed for this purpose, in which the repeater is efficiently shared by a number of earth stations in the time division fashion. In such a system, a phase shift keying modem adapted to the encoded information signals is known to be effective. For the handling of a greater amount of information, a multi-phase PSK moden system is preferred. In the TDMA communication system now in use, the signal from each of the earth stations is divided for transmission into a group of signals of suitable duration forming a "burst." The burst transmitted from each earth station is time-division multiplexed when viewed at the on-board relay equipment. On the other hand, carrier wave frequencies assigned to individual earth stations are slightly different from one another and are not mutually synchronized.

For the signal reception at an earth station, the so-called synchronized detection system is known to be effective, which relies on a reference carrier wave synchronized with a carrier wave component extracted from the received signal. However, the received carrier wave does not remain synchronized during the period lying between every two burst signals. It is therefore necessary to generate the reference carrier wave which is in synchronism with the received carrier wave at every time point corresponding to the burst. However, a certain amount of time called "acquisition time" is needed for the completion of this process of carrier synchronization or carrier wave restoration. This results in a large phase difference between the received carrier wave and the generated reference carrier wave, and consequently in a marked increase in the code error rate particularly at every time point corresponding to the leading portion of every burst, where the above-mentioned synchronization process is not completed yet. In practice, therefore, most of the time-division multiple-access satellite communication systems resort to a preamble word for the reference carrier wave restoration and bit timing synchronization inserted at the leading portion of every burst transmitted from each ground station. The preamble word ordinarily includes a "carrier recovery" portion which is for establishing a synchronized relationship between the received carrier wave and the reference carrier wave generated at the receiver. The carrier recovery portion is followed first by a "bit timing recovery" portion and then a "station address code or unique word." However, the following description will be given, for simplicity, with the "carrier recovery" portion and "bit timing recovery" portion referred to as the preamble word. Furthermore, in the burst, the preamble word is followed by an information word to be transmitted. To enhance the traffic efficiency, the preamble word should be as short as possible. Furthermore, for shortening the acquisition time with phase jitter kept within a predetermined tolerance, the preamble word should preferably be unmodulated, but the bit timing signal can never be recovered from unmodulated signals.

One of the conventional schemes to solve this contradiction is to divide the preamble word in time domain into two portions, so that in one portion the signal may be unmodulated for the establishment of recovery of the reference carrier wave while in the other portion the signal may be, at every two adjacent bits, 180° out of phase (i.e., o, $\pi$, 0, $\pi$, ...) for the establishment of the bit timing. This scheme is not effective because the preamble word inevitably is neeeded for acquisition time to establish the recovery of both the reference carrier wave and the bit timing signal.

In another method proposed for the same purpose, the entire preamble word is phase-modulated and, at the receiver, the establishment of the recovery of the reference carrier wave is maintained resorting to the extraction of the carrier wave component from the received PSK signal with the recovery of the bit timing signal carried out at the same time. Such a system has a combination of means for cancelling the phase-modulated components and means for reducing the phase jitter. There are three kinds of techniques for cancelling the phase modulated components. They are as follows:

a. Reverse modulation for converting the PSK signal into a continuous wave signal having a given repetition frequency. This is carried out by using a reverse modulator;
b. Frequency multiplication-division method for frequency-multiplying the PSK signal by the numbers of the possible phase positions so as to cancel the modulated components and for performing frequency-division of the frequency-multiplied signal; and
c. The "Costas" method for performing a function equivalent to reverse modulation by the use of multipliers operated in baseband (This method is combined with a phase-lock loop).

On the other hand, conventional methods for reducing the jitter may be classified into two types. One is based on a phase-lock loop and the other on a band pass filter. The former is featured by the narrow bandwidth of equivalent noise and the effective suppression of jitter. However, it is not advantageous as compared with the latter in that it tends to need longer acquistion time.

These methods of the carrier wave recovery based on the extraction of the carrier wave component from the PSK signal are not so efficient as the previously mentioned method based on the use of the unmodulated signal. Characteristics of circuit elements such as the reverse modulator, the frequency multiplier, and the multiplier are essentially nonlinear. These properties tend to deteriorate the signal to noise ratio of the received carrier wave and to cause phase jitter of the reference carrier wave. To avoid these problems, longer acquisition time is needed.

The object of this invention is therefore to provide an improved synchronizing system for the burst mode PSK telecommunication system, which requires shorter acquisition time for the regeneration of the reference carrier wave and the timing signal and which ensures sufficiently alleviated phase jitter.

A feature of the synchronizing system according to the present invention lies in the structure for the transmission and reception (or demodulation) of the PSK signals in burst mode, which include the preamble word portion phase modulated to take alternate phase positions $\alpha$ and $\beta$ (wherein both $\alpha$ and $\beta$ may be arbitrary phase positions under the condition that $\beta$-$\alpha$is not equal to 0 or $\pi$) and the following information word N-phase PSK modulated to take phase position $2\pi/N\ i$ (where $N$ is a positive integer and i , = 0, 1, 2, 3, . . ., or $N$—1).

Since the preamble word portion is alternately modulated to have phase position $\alpha$ and $\beta$ and since there exists invariably the reference carrier component in this portion, the reference carrier wave can be extracted without cancelling the phase modulation components of the entirely phase-modulated preamble word portion. Also, because the preamble word includes alternative phase-modulated components, the bit timing signal is derived by a conventional bit timing recovery circuit.

In the demodulator of this invention, a bandpass filter possessing the function of noise reduction that is, the reduction of phase jitter, and an amplitude-limiter for the removal of the amplitude variations can be employed as a circuit for extracting a reference carrier. This eliminates the possibility of an increase in both phase jitter and acquisition time due to the cancellation of the phase modulated components.

At the information word portion, the received signal is detected with respect to the phase of the recovered reference carrier wave and the received signal is phase modulated in the reverse sense (cancellation of the phase modulated components relies on reverse modulation) in a controlled N-phase phase modulator by the use of the detected output. The output of the controlled N-phase modulator where the phase modulated components are cancelled by the reverse modulation is applied to the carrier extracting circuit wherein the reference carrier is extracted as the phase-modulation-cancelled wave.

Switching between the synchronizing operations in the preamble word portion and in the information word portion is carried out by controlling the operating state of the controlled N-phase phase modulator and a phase shifter according to a control signal.

The foregoing and other objects and features of this invention will be better understood from the following detailed description taken in conjunction with the accompanying drawings, wherein.

While the principle of the present invention is applicable generally to an N-phase phase-modulation, the following description will be given, for simplicity, about $N$ =4, namely a four-phase phase-modulation.

Figure 2:
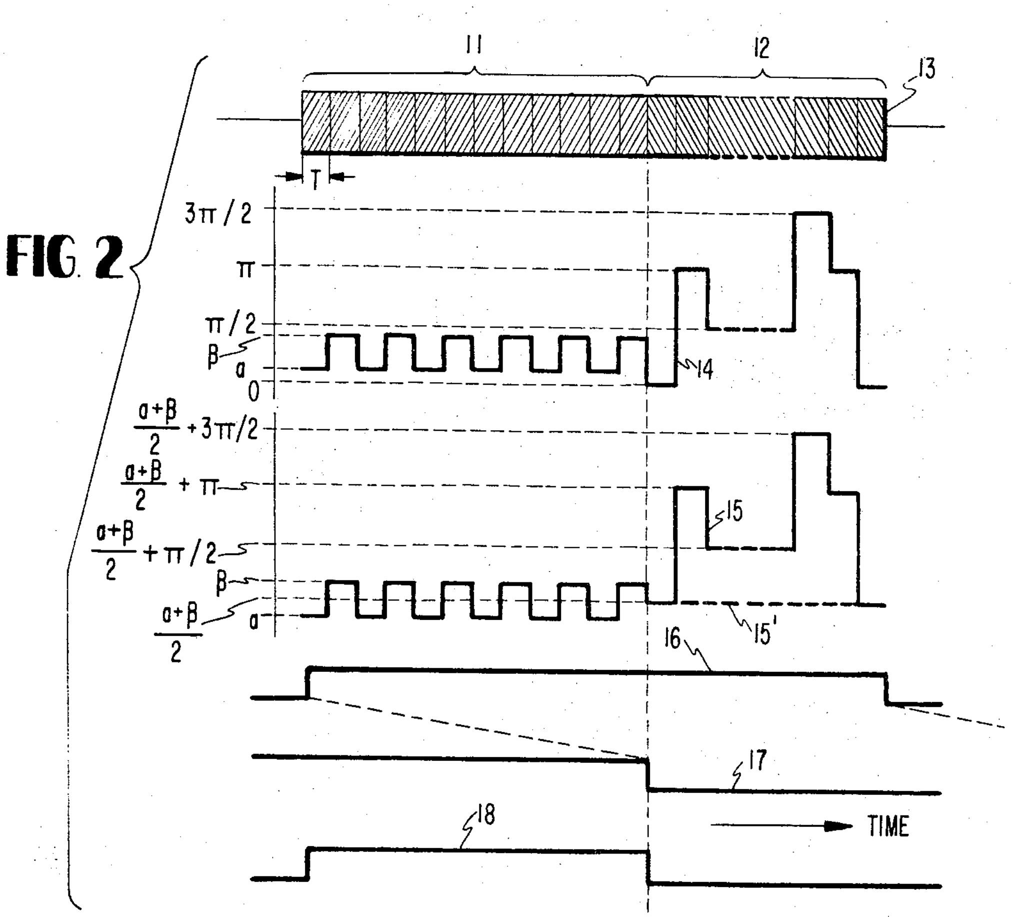
FIG. 2 is a timing chart depicting waveforms at various portions in the demodulator shown in FIG. 1.
Figure 3:
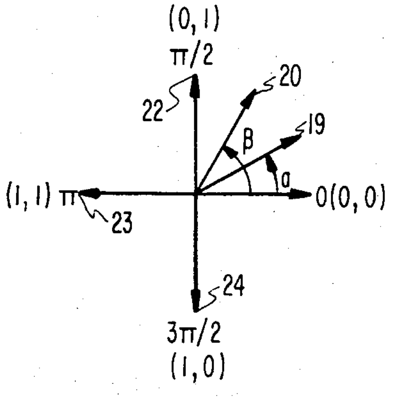
FIG. 3 is a vector diagram depicting the phase relationship of a received signal of the demodulator shown in FIG. 1.

Referring to the timing chart of FIG. 2, the envelope of a burst signal 13 consists of a preamble word 11 and an information word 12. T denotes the repetition period which is the reciprocal of bit timing frequency. The burst signal 13 is phase modulated at every repetition period so as to produce phase variations as shown at waveform 14. In the preamble word portion 11, the phase takes the values $\alpha$ and $\beta$ alternately and in the information word portion 12, the phase takes any of the discrete phase values 0, $\pi/2$, $\pi$, $3\pi/2$. Referring to the phase relationship between the preamble word portion and the information word portion as shown in FIG. 3, the phase in the preamble word portion is represented by vectors 19 and 20 and the phase in the information word portion by vectors 21, 22, 23, and 24.

A PSK modulated wave having the preamble word portion alternately taking the phase $\alpha$ and $\beta$ and the information word portion taking $2\pi/N\ i$ ($N$: positive integer; $i$ = 0, 1, 2, ..., or $N$—1) phases at every time slot, is then produced by a conventional phase modulator in the following manner. As is well known, a phase modulator is in use which is capable of phase-shifting to 0, $\pi/2$, $\pi$, and $3\pi/2$ phase positions in response to the codes (0,0), (0,1), (1,1) and (1,0) respectively, as shown in FIG. 3. Each of these codes is bit parallel data which take the form of the combination of two binary data applied to two parallel input terminals. At a preamble word portion of a burst transmitted through the system of the present invention, one input terminal continuously receives a sequence of 0 and the other is alternatively supplied with 0 and 1. It follows from this that the alternative phase positions $\alpha$ and $\beta$ appear as 0 phase position and $\pi/2$ phase position at the output terminal of the modulator. The information word is ordinarily phase-modulated by the conventional phase modulator where the 0, $\pi/2$, $\pi$, or $3\pi/2$ phase shift is produced in response to the information data to be transmitted.

Figure 1:
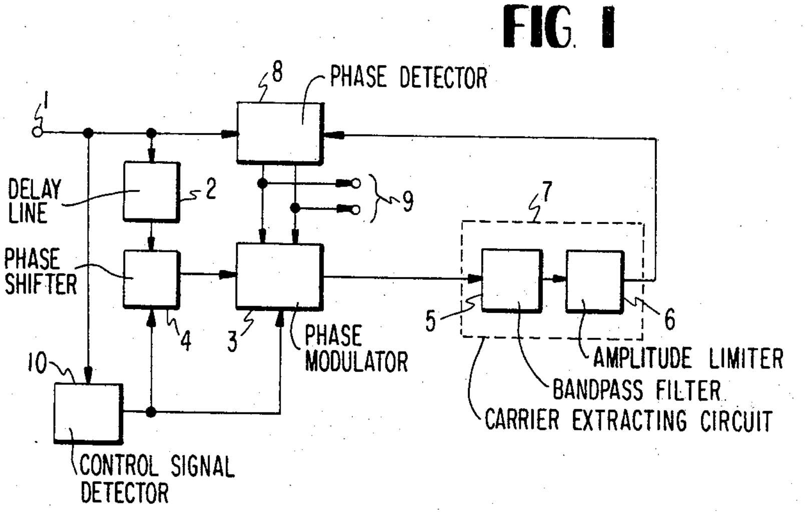
FIG. 1 is a block diagram of a demodulator of this invention.

Referring now to the demodulator of the embodiment of this invention shown in FIG. 1, a received signal applied to input terminal 1 is fed simultaneously to four-phase phase detector 8, control signal detector 10, and delay line 2. The output of the delay line 2 is fed to a controlled four-phase modulator 3 through phase shifter 4. The output of the controlled four-phase phase modulator 3 is applied to a carrier extracting circuit 7. The carrier extracting circuit 7 in this embodiment consists of bandpass filter 5 having a narrow passband for the noise removal and amplitude limiter 6 for the removal of amplitude variations. The control signal detector 10 is for detecting whether the received signal is in the preamble word portion (or a first state) or in the information word portion (or a second state), and for supplying the control signal to both the controlled four-phase phase modulator 3 and the phase shifter 4.

The controlled four-phase phase modulator 3, controlled by a control signal of the first state, develops an output signal identical to the input signal and applies it to the carrier extracting circuit 7, with the modulated components retained untouched. As regards a control signal of the second state, the four-phase phase modulator 3 performs reverse modulation on the input passing through the delay line 2 and the phase shifter 4, in response to the detected output from the four-phase phase detector 8. The output of the phase modulator 3 whose phase modulated components have been cancelled is fed to the carrier extraction circuit 7.

The reference carrier wave is extracted at the carrier extraction circuit 7. In the four-phase phase detector (phase-comparator)8, the received signal is phase-compared with respect to the phase of the reference carrier, and the detected outputs are obtained at output terminal pair 9. The detected outputs are simultaneously fed to the controlled four-phase phase modulator 3. The reason why two detected output channels are provided is that each symbol of the four-phase phase-modulated wave contains two bits of information. Therefore, the bit-parallel detected outputs are usually obtained as binary code trains of two channels.

As is apparent from the foregoing description, the phase-shifter 4 provides phase shift of 0 and $(\alpha+\beta)/2$ (generally $(\alpha+\beta)/2+2\pi/N\,j$, $N$ is a positive integer and $j=0, 1, ...,$ or $N-1$, $N=4$ and $j=0$ in this case) for a passing signal when the control signal is in the first state and in the second state, respectively.

On the other hand, the bit timing signal is regenerated by a conventional bit timing recovery circuit (not shown) connected between the input terminal 1 and output terminals 9.

A more detailed description of the demodulator will now be given with reference to the waveforms observed at various points of the system of this invention.

First, the operation of the demodulator for the preamble word portion will be analyzed.

Figure 4:
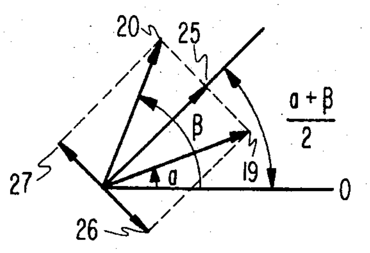
FIG. 4 is a vector diagram depicting the phase relationship between the preamble portion of a recived signal and recovered reference carrier.

Referring to the vector diagram of FIG. 4 depicting the phase relationship of the vectors 19 and 20 (corresponding to phase positions $\alpha$ and $\beta$ ) and the extracted reference carrier wave, vector 19 is the vector sum of vector 25 and vector 26, while vector 20 is the sum of vector 25 and 27.

The phase in the preamble word portion may be therefore considered as the sum of vector 25 indicating a continuous component and vectors 26 and 27 which occur alternately. Since the vectors 26 and 27 are equal in magnitude and opposite in sense, they cancel out each other in the bandpass filter 5, which has a narrow passband.

On the other hand, since the vector 25 represents the continuous input signal component, it can be derived from the bandpass filter 5. The passband of the filter 5 should be as narrow as possible for noise suppression, but it must be as wide as possible for shortening the acquisition time. The actual system design needs to be based on the compromise between these inconsistent requirements.

Amplitude variation in the output of bandpass filter 5 is eliminated by the amplitude limiter 6 to provide the reference carrier output free from amplitude variation. The phase of the reference carrier wave is $(\alpha+\beta)/2$ as is apparent from FIG. 4, when the delay times of the circuit elements are disregarded.

Thus, the reference carrier is recovered at the preamble word portion without any reverse modulation or frequency multiplication. At the same time, the bit timing signal is derived in the above mentioned manner.

An advantage of this system is, as mentioned previously, that the noise accompanying the cancellation of the phase-modulated components decreases and that the acquisition time is shortened without being substantially affected by noise.

Now a brief description will be given about the adverse effect of noise on the acquisition time.

Assuming that the cancellation of the phase modulated components is carried out by reverse modulation in the controlled four-phase phase modulator for the purpose of extracting the reference carrier component even in the preamble word portion, the reference carrier wave is not extracted at the leading portion of the burst. Instead, only noise appears at the output terminal of the carrier extracting circuit. Therefore, at this time point, the four-phase phase detector does not properly detect the received signal and noise is dominant in the detected output. It follows therefore that the output of the controlled four-phase phase modulator, which is reverse modulated with the detected output, fails to effect the cancellation of the phase modulated components. In other words, the output of the modulator does not include the reference carrier component, but a large noise component. Through the cyclic repetition of this process, the S/N ratio can be improved and the desired reference carrier wave can be recovered. However, a longer time is needed in this case for recovery of a reference carrier wave component having sufficiently high S/N ratio than is needed by relying on a bandpass filter. This is due to the fact that the extracting operation starts under the initial condition where a transient phase deviation is not avoidable at the leading portion of the burst because of noise. The advantage of the carrier recovery without resorting to the reverse modulation in the preamble word portion is very remarkable.

The information word portion will now be described. In this portion, the control signal is in the second state and the phase shifter 4 provides a phase shift of $(\alpha+\beta)/2$ to the phase of the signal passing therethrough. The received signal phase represented at 14 in FIG. 2 varies as shown at 15 corresponding to the output signal of the phase shifter 4.

Figure 5:
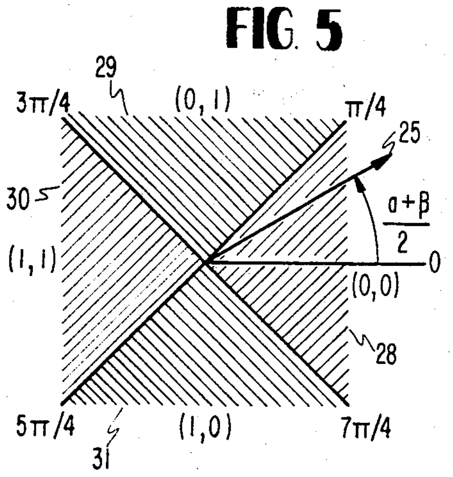
FIG. 5 is a phase diagram depicting the operation of the four-phase phase detector.

Now operation of the four-phase phase detector 8 will be described. The reference carrier having phase $(\alpha+\beta)/2$, which has been recovered from the preamble word portion, is supplied to the detector from the carrier extracting circuit 7. FIG. 5 depicts the phase relationship between the received signal applied from terminal 1 to the four-phase phase detector 8 and the detected output which is detected at the detector 8 with reference to the reference carrier from the circuit 7. When the phase of received signal is within the $\pm\pi/4$ region 28 centered on the 0 phase position, the detected output is (0,0). When it is within the $\pi/4$ to 3 $\pi/4$ region 29, the output is (0,1), likewise, for 3 $\pi/4$ to 5 $\pi/4$ region 30, the output is (1,1); and for 5 $\pi/4$ to 7 $\pi/4$ region 31 the outut is (1,0). The four-phase phase detector may be composed, for example, of a sine wave detector and a cosine wave detector, and a phase shifter for providing a phase shift of $\pi/4 - (\alpha+\beta)/2$.

The phase shift value $\pi/4 - (\alpha+\beta)/2$ is preselected taking the following factors into consideration. The two reference carrier waves supplied to the four-phase phase detector usually take phase positions having a phase difference of approximately $\pi/4$ with respect to the four-phase positions of the received phase-modulated carrier waves (i.e., 0, $\pi/2$, $\pi$, and 3 $\pi/2$ shown in FIG. 3). The phase-shift by $\pi/4 - (\alpha+\beta)/2$ indicates therefore that the $(\alpha+\beta)/2$ phase-shifted by the phase shifter 4 should be cancelled and that the phase positions of the reference carrier waves should be shifted by approximately $\pi/4$ from the four phase positions of the received phase-modulated carrier waves.

The detected outputs are derived from terminal pair 9 and applied to the controlled four-phase modulator 3 for the phase modulation of the received signal supplied through the delay line 2 and the phase shifter 4. The delay line 2 imparts a delay-time so that the detected output corresponding to a received signal component may be applied to the modulator 3 simultaneously with the same received signal component. For this purpose, the delay time is set equal to the difference in delay time between the phase detector 8 and the phase shifter 4.

The relations between the detected output and the phase modulation of the controlled four-phase phase modulator 3 are determined as follows: When the detected outputs are (0,0), (0,1), (1,1), and (1,0), phase shifts of 0, $-\pi/2$, $\pi$, and $+\pi/2$ are respectively given to the received signal passing through the modulator 3.

Then, as is apparent from waveforms 14 and 15, the output of the controlled four-phase phase modulator 3 becomes a continuous signal having a given phase shift $(\alpha+\beta)/2$. The phase of this continuous wave is indicated by dotted line 15' in FIG. 2. The continuous wave produced in this way is caused to remove the noise component at the carrier extraction circuit 7 and is derived from the circuit as the reference carrier wave.

The reference carrier wave has the same phase $(\alpha+\beta)/2$ in both the preamble and information word portions and no discontinuity is seen at their boundary. This is the reason why the phase shifter 4 controlled by the control signal is provided in the demodulator.

As will be obvious from the foregoing description, the phase shifter 4 shown in FIG. 1 may be disposed at the point immediately after the input termainl 1 (In this case, the phase shift $(\alpha+\beta)/2$ of the phase shifter not shown in the circuit 8 is dispensable). Alternatively, it may be at a point immediately preceding delay line 2, or at a point between the controlled four-phase phase modulator 3 and carrier extractor 7. The last-mentioned point is preferred because the passband of the phase shifter 4 can be made relatively narrow because of the given phase of continuous wave signal passing therethrough.

In a conventional receiving equipment for a digital signal, the operation called "pulse regeneration in baseband" is performed to obtain a noise-free binary demodulated signal. This operation includes the process of sampling a detected output at a timing signal interval and amplitude-discriminating the sampled output. In the demodulator of this invention shown in FIG. 1, such means for sampling and discriminating may be provided outside the output terminal pair 9. The sampling-discriminating circuit may be installed at the point immediately following the output terminal of the four-phase phase detector. In this case, the controlled four-phase phase modulator 3 is driven by the demodulated baseband pulses and its operation should become so much secure.

To operate the sampling-discriminating circuit, a timing signal is needed. It is from the leading portion of the information word portion that the modulator 3 begins to be driven. Therefore, the bit timing signal that has been recovered by this time can be utilized. In other words, the output of the abovementioned bit timing recovery circuit plays the role of the timing signal.

When this demodulator of the embodiment, the control signal is switched from the first to the second state at the moment where the preamble word of the received signal is turned to the information word. Actually, however, malfunction of the control signal detector due to noise is possible. Therefore, it is desirable to switch the control signal prior to the transient period from the preamble portion to the information portion with some allowance time. A demodulator to meet this requirement may be constructed according to this invention in a similar manner to said demodulator, except that the preamble word is lengthened by an amount equal to the allowance time. The phases $\alpha$ and $\beta$ can take any values, so far as $\beta - \alpha$ is not equal to 0 or $\pi$.

For simplicity of the transmitter, it is advantageous to select values of $\alpha$ and $\beta$ among $N$ discrete phases which are taken within the information word portion such as $\beta = \pi/2$ and $\alpha = 0$ for $N = 4$. While the phase shift of the phase shifter 4 has been $(\alpha+\beta)/2$ in the foregoing description, it may be $(\alpha+\beta)/2 + (2\ \pi/N)$j for an arbitrary integer $N$. The reason why $(2\pi/N)j$ is provided is to give a phase shift of $(2\pi/N)j$ for obtaining the reference carrier waves having $(\alpha+\beta)/2$ phase shifts at both the preamble and information word portions even in the case where the reverse modulation by the modulator 3 is not complete but leaves a $(2\pi/\mathrm{N})$j phase-modulated component.

Figure 6:
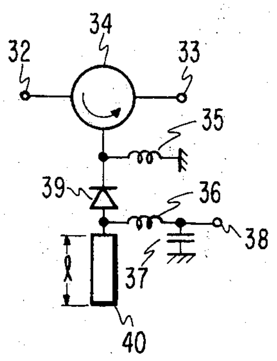
FIG. 6 is a circuit diagram of an example of a phase shifter which can be incorporated in this invention.

Next, a concrete example of circuit elements constituting the demodulator of the present system will now be described. Referring to FIG. 6, the phase shifter 4 for giving the phase shift of $(\alpha+\beta)/2 + (2\pi/\mathrm{N})$j is of the known reflection type having a diode. A received signal applied to terminal 32 passes through a circulator 34 and reaches diode 39. The reflected wave at the diode 39 emerges at output terminal 33 through the circulator 34, when the diode is in a cutoff state. When the diode is in a conductive state, the signal is reflected at the open end of a transmission line 40 of length $l$ to pass through the circulator 34 and emerges at output terminal 33. The cutoff/conduction control of the diode is carried out by changing the polarity of the bias voltage applied to the diode in response to the control signal supplied from the circuit 10.

Inductive elements 35 and 36 and capacitor 37 constitute the biassing circuit. In order to give the phase shift of $(\alpha+\beta)/2 + (2\pi/\mathrm{N})$j to the passing signal, the line length $l$ must be designed equal to $(\alpha+\beta/8\pi + j/2N)\ \lambda$, where $\lambda$ is the wavelength on line 40, (It is assumed here that the diode is an ideal on/off element). Thus, when the control signal detected by the circuit 10 is in the first state, the received signal is reflected at the diode without undergoing any phase shift and when the signal is in the second state, the received signal is reflected at the line 40 with ($\alpha + \beta/2 + 2\pi/N\ j$) phase shift which is given by the two-way travelling of the wave through the line 40.

Figure 7:
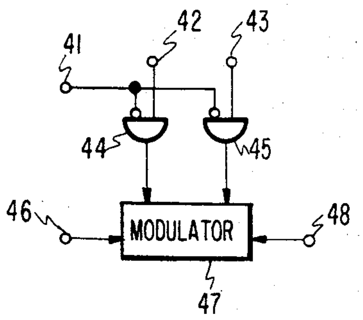
FIG. 7 is a circuit diagram of an example of a controlled four-phase phase modulator which can be incorporated in this invention.

Referring to FIG. 7, which shows a circuit diagram of an example of the controlled four-phase phase modulator 3, reference numeral 47 denotes a conventional four-phase phase modulator and, 46 and 47, denote input and output terminals connected to the phase shifter 4 (FIG. 1) and the bandpass filter 5 (FIG. 1), respectively. The modulator 47 phase-modulates the signal in response to the output codes of inhibit gates 44 and 45. These gates receive the detected outputs (or the outputs of the detector 8 in FIG. 1) through terminals 42 and 43 and the control signal (the output of the circuit 10 in FIG. 1) through control terminal 41. With the first and second states of the control signal set to the binary codes 1 (mark) and 0 (space), code (0,0) is sent to the modulator 47 regardless of the detected output condition when the control signal is in the first state, whereas the detected output is fed, without being inhibited, to the modulator 47 when the control signal is in the second state. In this manner, the reverse modulation is performed.

Figure 8:
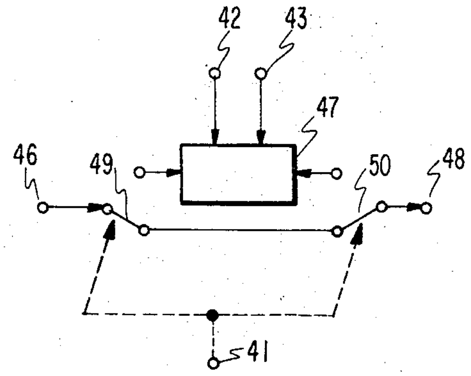
FIG. 8 is a circuit diagram of another example of the controlled four-phase phase demodulator.

In another example of the controlled four-phase phase modulator shown in FIG. 8, constituents 41, 42, 43, 46, 47, and 48 are the same as those in FIG. 7. Reference numbers 49 and 50 denote interlocked switches whose operation is controlled by a control signal applied to terminal 41.

When the control signal is in the first state, both switches come in contact with lower contacts to feed the signal applied to terminal 46 to terminal 48 as it is. When the control signal is in the second state, both switches come into contact with upper terminals, so that the signal applied to terminal 46 is fed to the four-phase phase modulator 47. In this manner, the reverse modulation is performed in response to the detected outputs delivered from terminals 42 and 43. The output of the reverse modulation is obtained at terminal 48.

Figure 9:
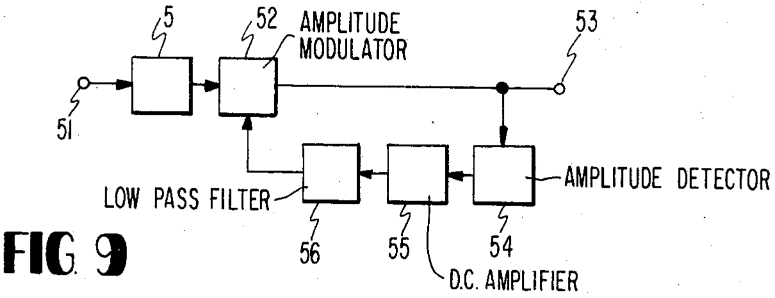
FIG. 9 is a block diagram of an example of a carrier extraction circuit comprising an autoatic voltage control circuit.

Referring to FIG. 9, which shows a block diagram of an example of the carrier extraction circuit, the amplitude limiter 6 shown in FIG. 1 (Stated specifically, an amplitude limiter containing a diode may be used for example) is replaced by an automatic voltage control (AVC) circuit. A signal supplied through input terminal 51 passes through the bandpass filter 5 and its amplitude variation is removed by an amplitude modulator 52 before appearing at output terminal 53. The control signal for the amplitude modulator 52 is obtained from a feedback circuit consisting of amplitude detector 54, DC amplifier 55, or low-pass filter 56. This automatic voltage control circuit may be of any know type. The automatic voltage control circuit o the low-pass filter should have a passband whose bandwidth is equal to or wider than one half of the passband of the filter 5.

Figure 10:
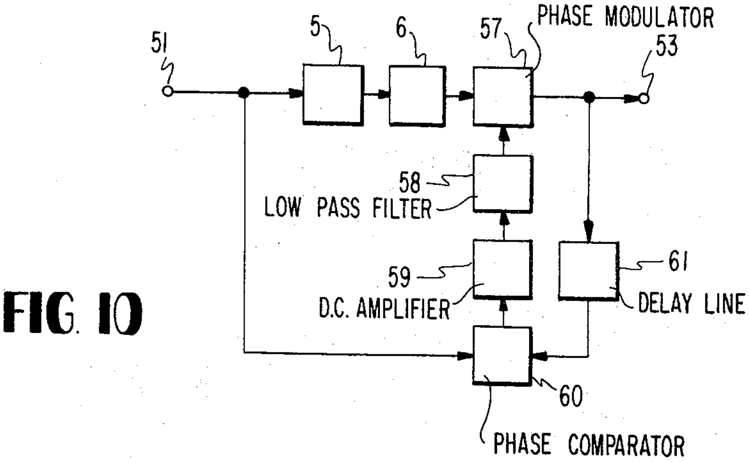
FIG. 10 is a block diagram of an example of a carrier extraction circuit comprising an automatic phase-control means employed in the present invention.

Referring to another example of the carrier extraction circuit shown in FIG. 10, the cascade connection of bandpass filter 5 and amplitude limiter 6 is similar to that shown in FIG. 1, except that an automatic phase control circuit is employed in the circuit of FIG. 10. A bandpass filter has such a characteristic that the phase of signal passing therethrough undergoes a change depending on the change in the input signal frequency with respect to center frequency of the bandpass filter. Therefore, the extracted reference carrier wave undergoes a phase deviation when the frequency stability of the received signal is poor or when the center frequency of the bandpass filter 5 appreciably fluctuates due to the change in the ambient temperature. The narrower the passband of the filter is the more serious this problem is, causing phase jitter in the extracted reference carrier. The automatic phase control circuit in the example of FIG. 10 is provided to solve this problem. More specifically, a portion of the received signal supplied through input terminal 51 is branched and fed to phase comparator 60 to permit its phase comparison with the output signal derived from terminal of the delay line 61. When the difference between the two phases deviates from a predetermined value, a phase error signal generated at the phase comparator 60 is delivered through DC amplifier 59 and low-pass filter 58 to analogue phase modulator 57, which controls the amount of phase shift. The delay line 61 is for locking the phase relations between the received signal and the reference carrier wave, at the input ends of the four-phase phase detector 8 (FIG. 1), even when there is a frequency variation in the carrier frequency of the received signal. The delay time should be set to be equal to the summation of the delay time of delay line 2, phase shifter 4, and controlled four-phase phase modulator 3.

Figure 11:
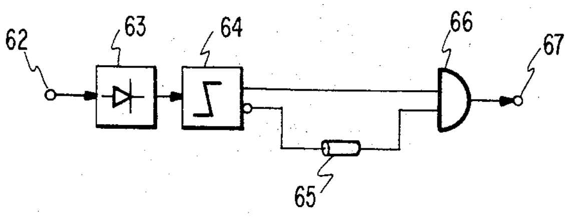
FIG. 11 is a circuit diagram of an example of a control signal detector.

Referring now to FIG. 11, which shows an example of the control signal detector, the received signal applied to input terminal 62 is detected by envelope detector 63. Whether the detected output exceeds a threshold value is detected by threshold circuit 64. The output developed from the threshold circuit is a pulse having a width equal to the duration of the incoming burst as shown at 16 in FIG. 2. The waveform 17 in the same figure indicates a signal corresponding to the complementary output of the threshold circuit, which is delayed at the delay line 65 by an amount of equal to the duration of the preamble word.

Logic operation on the signals having the waveforms 16 and 17 is performed at AND circuit 66, to provide an output of waveform 18 at output terminal 67. As will be apparent from the waveform 18, the control signal state corresponding to the preamble word is different from that corresponding to the information word. Therefore, this signal can be used as the control signal for the embodiment of FIG. 1.

As previously described, when the control signal state is switched before the state of the received signal is changed from the preamble word to the information word to avoid the influence of the possible noise-caused malfunction of the control signal detector, the delay time given at the delay line 65 in FIG. 11 is reduced by the amount of the allowance time.

In a time-division multiple-access burst mode satellite communication system, a unique word called "station address code" is usually transmitted in the portion immediately following "bit timing recovery" in the preamble word and the frame syncrhonization is performed at the receiving side through the detection of the unique word. It will be obvious that the control signal can be recovered by the use of the frame synchronizing signal. This method is advantageous over the envelope detection of the received signal (FIG. 11), in securing the control signal of reduced error rate.

While we have described above the principles of this invention in connection with several embodiments assuming a particular case where $N = 4$, it will be obviosu to those skilled in the art that this invention can be realized for cases where $N$ is any positive integer. Furthermore, while the forgoing description has been confined to the cases where $j=0$ for $(\alpha+\beta)/2+(2\pi/N)j$, it will be apparent that $j$ can take any positive integer from 0 to $N-1$.

The present invention has a great deal of practical utility in providing a synchronizing system featured by the short acquisition time and the minimum phase jitter, which are most effectively applied to the burst mode PSK telecommunication systems.

What is claimed is:

1. A demodulator for a synchronizing system for a phase-modulation telecommunication system using a burst signal including a preamble word portion so phase-modulated as to take alternate phases $\alpha$ and $\beta$ (where both $\alpha$ and $\beta$ are arbitrary phase, with $\beta-\alpha$ being unequal to 0 or $\pi$) and an immediately subsequent information word portion so N-phase phase modulated as to take phases $(2\pi/N)i$ (where N is a positive integer and $i=0, 1, 2, \ldots,$ or N-1), said demodulator comprising:

a. a reference carrier wave extraction circuit having a bandpass filter with its center frequency present equal to the carrier frequency of a received signal including said brust signal and an amplitude limiter connected in cascade therewith, b. an N-phase phase detector for detecting the phase of the received signal with respect to that of the reference carrier wave, c. a controlled N-phase phase modulator, having input terminal for said detected output, input terminal for said received signal, and control terminal for receiving a control signal, for providing a first or a second output signal depending on whether said control signal is in a first or a second state, said first output signal being identical to said received signal while said second output signal corresponding to the received signal phase-modulated in response to said detected output, d. a phase shifter, having a control terminal for receiving said control signal, for adding an amount of phase shift $(\alpha+\beta)/2+(2\pi/N)j$ ($j=0, 1, 2, \ldots,$ or $N-1$) to the phase of a signal passing therethrough in response to the control signal, and e. means for generating said control signal at least without a time delay with respect to the boundary between said preamble word and information word portions of said received signal in such a way that the control signal state can be switched from said first state to said second state.

2. A demodulator for a synchronizing system in a phase-modulation telecommunication system using a burst signal including a preamble word portion so phase-modulated as to have alternate phases $\alpha$ and $\beta$ where both $\alpha$ and $\beta$ are arbitary phases with $\beta-\alpha$ being unequal to 0 or $\pi$, said preamble having an effective phase of $\alpha+\beta/2$, and an immediately subsequent information word portion so N-phase phase modulated as to take phases $(2\pi/N)i$ where N is a positive integer and $i=0, 1, 2, \ldots,$ or $N-1$, said demdulator comprising:

a. a reference carrier wave extraction circuit for extracting a reference carrier wave from said burst signal and having a bandpass filter with its center frequency equal to the carrier frequency of a received signal including said burst signal, and an amplitude limiter connected in cascade with said extraction circuit; and or b. an N-phase phase detector for detecting the phase of the received signal relative to that of the extracted reference carrier wave and producing a detected output indicative of the relative phase;

c. a controlled N-phase phase modulator, having an input terminal for receiving said detected output, an input terminal for said received signal, and a control terminal for receiving a control signa; said modulator providing a first or a second output signal depending on whether said control signal is in a first or a second state, said first output signal being identical to said received signal and said second output signal corresponding to the received signal phase-modulated in response to said detector output, said output signals being applied to said extraction circuit;

d. a phase shifter, having a control terminal for receiving said control signal, and responsive to the second state thereof for adding an amount of phase shift $(\alpha+\beta)/2+(2\pi/N)j$ ($j=0, 1, 2, \ldots,$ or $N-1$) to the phase of said second output signal; and e. means responsive to the received signal for generating said control signal so that it switches from said first state to said second state at a time related to the time of occurrence of the boundary between said preamble word and information word portions of said received signal whereby said extracted reference carrier has the same phase during both said preamble and information word portions, and no discontinuity occurs in said reference carrier at said boundary.

3. A demodulator as defined in claim 2 wherein said phase shifter is connected between said phase modulator and said extraction circuit so that said first and second output signals pass therethrough, said phase shifter being responsive to said first state of said control signal to impart a zero phase shift to said first output signal passing therethrough.

4. A demodulator as defined in claim 2 wherein said control signal switches from said first to said second state at the time of occurrence of said boundary.

5. A demodulator as defined in claim 2 wherein said control signal switches from said first and said second state prior to the occurrence of said boundary to compensate for possible malfunction of said control signal generating means.

6. In a synchronizing system for a phase-modulation telecommunication system using a burst signal including a preamble word portion so phase-modulated as to take alternate phases $\alpha$ and $\beta$ where both $\alpha$ and $\beta$ are arbitrary phases with $\beta-\alpha$ being unequal to 0 or $\pi$, said preamble having an effective phase of $\alpha+\beta/2$, and an immediately subsequent information word portion so N-phase phase modulated as to take phases $(2\pi/N)i$ where N is a positive integer and $i=0, 1, 2, \ldots,$ or $N-1$, a method of reducing the time required to regenerate a reference carrier signal from a received signal including said burst signal comprising:

a. filtering out the carrier frequency of the preamble word portion of said received signal and extracting therefrom a reference carrier signal having a phase of $\alpha+\beta/2$;

b. reverse N-phase phase modulating the information word portion of the received signal and imparting thereto a phase shift of $(\alpha+\beta)/2+(2\pi/N)j$ ($j=0, 1, 2, \ldots,$ or $N-1$);

c. filtering out the carrier frequency from the reversely modulated and phase-shifted signal produced in paragraph (b) and extracting therefrom a reference carrier signal, whereby the reference carrier signal is continuously recovered across the boundary of the preamble and information word portions of the received signal; and d. phase detecting the received signal relative to the extracted reference carrier signals to demodulate the phase-modulated received signal.

* * * * *

UNITED STATES PATENT OFFICE
CERTIFICATE OF CORRECTION

Patent No. 3,769,587 Dated October 30, 1973

Inventor(s) Yoshio MATSUO and Shigetoki SUGIMOTO

It is certified that error appears in the above-identified patent and that said Letters Patent are hereby corrected as shown below:

Col. 1, line 16 - Delete "proosed" and substitute -- proposed -- line 22 - Delete "moden" and substitute -- modem --

Col. 2, line 13 - Delete "0" and substitute -- o --

Col. 3, line 9 - There should be a space between $\alpha$ and "is"

Col. 5, line 64 - Delete "the" and substitute -- a --

Col. 6, line 67 - Delete "outut" and substitute -- output --

Col. 8, line 14 - Delete "When" and substitute -- With -- line 62 - Delete "($\alpha$ + $\beta$/8" and substitute -- (($\alpha$ + $\beta$)/8 --

Col. 9, line 1 - Delete "($\alpha$ + $\beta$/2" and substitute -- (($\alpha$ + $\beta$)/2 -- line 7 - Delete comma (,) after "47"

line 52 - Delete "or" and substitute -- and -- line 54 - Delete "o" and substitute -- or --

Col. 11, line 58 - Delete "$\alpha$ + $\beta$/2" and substitute -- ($\alpha$ + $\beta$)/2 -- line 68 - After "circuit;" delete "and or"

Col. 12, line 8 - Delete "signa" and substitute -- signal --
line 53 - Delete "$\alpha$ + $\beta$/2" and substitute -- ($\alpha$ + $\beta$)/2 --
line 64 - Delete "$\alpha$ + $\beta$/2" and substitute -- ($\alpha$ + $\beta$)/2 --

Signed and sealed this 25th day of June 1974.

(SEAL)
Attest:

EDWARD M.FLETCHER,JR.
Attesting Officer

C. MARSHALL DANN
Commissioner of Patents